United States Patent
Boulay et al.

[11] Patent Number: 6,152,522
[45] Date of Patent: *Nov. 28, 2000

[54] VEHICLE

[75] Inventors: Oliver Boulay, Tokio, Japan; Michael Raeth, Gaeufelden; Anton Reichel, Ditzingen, both of Germany

[73] Assignee: DaimlerChrysler AG, Stuttgart, Germany

[*] Notice: This patent issued on a continued prosecution application filed under 37 CFR 1.53(d), and is subject to the twenty year patent term provisions of 35 U.S.C. 154(a)(2).

[21] Appl. No.: 09/040,931

[22] Filed: Mar. 19, 1998

[30] Foreign Application Priority Data

Mar. 19, 1997 [DE] Germany .............. 197 11 379

[51] Int. Cl.$^7$ ......................................... B60N 3/00
[52] U.S. Cl. .................. 296/208; 296/37.14; 296/24.1
[58] Field of Search .................. 296/37.8, 37.14, 296/208, 24.1; 454/141–144, 152, 155

[56] References Cited

U.S. PATENT DOCUMENTS

| 2,882,809 | 4/1959 | Nelson ............................ 454/144 |
| 3,356,409 | 12/1967 | Belsky et al. .................... 296/24.1 |
| 4,512,239 | 4/1985 | Watanabe et al. ............... 454/144 |
| 4,699,322 | 10/1987 | Jobst ............................... 454/155 |

FOREIGN PATENT DOCUMENTS

| 3940361 | 12/1989 | Germany . |
| 4215136 | 11/1993 | Germany .......................... 296/37.8 |
| 406072251 | 3/1994 | Japan ............................ 296/37.14 |

*Primary Examiner*—Dennis H. Pedder
*Attorney, Agent, or Firm*—Evenson, McKeown, Edwards & Lenahan, P.L.L.C.

[57] ABSTRACT

An automobile has a ventilation shaft extending lengthwise on the vehicle floor between the front seats, the shaft being connected to an air-conditioning system to ventilate the foot area of the rear seats. A console is displaceably mounted on the top of the ventilation shaft, with an air duct formed in the bottom area of the console. The duct communicates in an air-exchange relationship with the ventilation shaft. To use the console that can be displaced lengthwise for optimally providing the rear seat passengers with air that is either warmed or air-conditioned as desired, the opening of the air duct that is at the end of the console that faces the rear seats is configured to optionally close or open, and a plurality of air outlet openings is provided in the shaft wall of the ventilation shaft. The openings are arranged in series within the displacement range of the console and are each provided with a closing element. A control mechanism operates between the console and the closing elements.

8 Claims, 4 Drawing Sheets

VEHICLE

BACKGROUND AND SUMMARY OF THE INVENTION

This application claims the priority of German application 197 11 379.6, filed Mar. 19, 1997, the disclosure of which is expressly incorporated by reference herein.

The present invention relates to a vehicle, especially an automobile with front and rear seats secured to the floor, with a ventilation shaft guided lengthwise between the front seats on the vehicle floor, said shaft, for ventilating the foot area of the front seats, being connected to an air-conditioning system of the vehicle, and with a console displaceable lengthwise in the manner of a carriage on the ventilation shaft, said console having an air duct formed in its bottom area, said duct being connected with the ventilation shaft through at least one air outlet opening provided in its shaft wall.

U.S. Pat. No. 3,356,409 discloses a vehicle in which the air duct formed in the floor area of the console is delimited at its underside extending over the console by the top of the ventilation shaft and sealed by nylon strips pressing against the ventilation shaft and the lower edge of the console. The air duct can be connected with the ventilation shaft by a valve located in the shaft wall of the ventilation shaft. From the air duct, air can pass through a plurality of openings into a narrow side chamber formed on the side wall of the console and flow from there through slots out into the interior of the console. The interior of the console that serves as a container for foods and beverages can be kept at a desired temperature by the air flowing through the interior. The temperature is adjusted at the entrance to the ventilation shaft by suitable conditioning of the air. The displaceability of the console along the ventilation shaft has the advantage that the console can be shifted into positions in which it can be conveniently accessed from both the front and rear seats. In addition, the console can be slid out of the space between the front seats so that it is possible to switch from one seat to the other without getting out of the vehicle.

An object of the present invention is to provide a vehicle with a console displaceable lengthwise and located between the front seats, whereby this console can additionally be used to optimally supply the rear-seat passengers with air that can be conditioned to their wishes, in other words to supply fresh air and/or warm or cool air.

The foregoing object has been achieved in the vehicle of the present invention by providing that air duct terminates freely at the end of console that faces rear seat, in that means are provided for optional complete or partial closure of duct opening, in that a plurality of air outlet openings is provided in the shaft wall of ventilation shaft, said openings being located one behind the other within the displacement range of console in the displacement direction, and each of said openings being provided with a closing element and in that a control mechanism is operative between console and closing elements, said mechanism keeping the air outlet openings located outside the overlapping area of console closed and keeping open at least one of the air outlet openings located within the overlapping area of console.

The vehicle according to the present invention has the significant advantage that a passenger in the rear seat can be supplied with fresh air or air-conditioned air adapted to her individual needs. This improves her sense of well-being, resulting in a qualitative gain in comfort. The control mechanism provided for coupling the air duct that is displaceable together with the console on the ventilation shaft in the various displacement positions of the console can be achieved in very different ways. For example, the closing elements can be actuated pneumatically, electrically, or electromagnetically. In addition, mechanical control elements such as a slot guide, pusher, springs, or the like can be used to actuate the closing elements.

According to a currently preferred embodiment of the present invention, the ventilation shaft is configured as a twin shaft with warm and cool air shafts extending parallel to one another. The air duct located in the floor area of the console is configured as a twin duct with warm and cool air ducts running parallel to one another, and the air outlet openings with closing elements are provided separately for connecting, on one hand, the warm air shaft and the warm air duct and, on the other hand, for connecting the cool air shaft and the cool air duct.

According to another embodiment of the present invention, a mixing chamber is located in front of the duct opening of the air duct, closable by control flaps, at one end of the console, in which chamber the warm and cool air ducts terminate. The air flow flowing out of the warm air and cool air ducts into the mixing chamber is metered, and the rear seat passenger has the opportunity to adjust the temperature individually in the rear independently of the temperature in front of the front seats.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
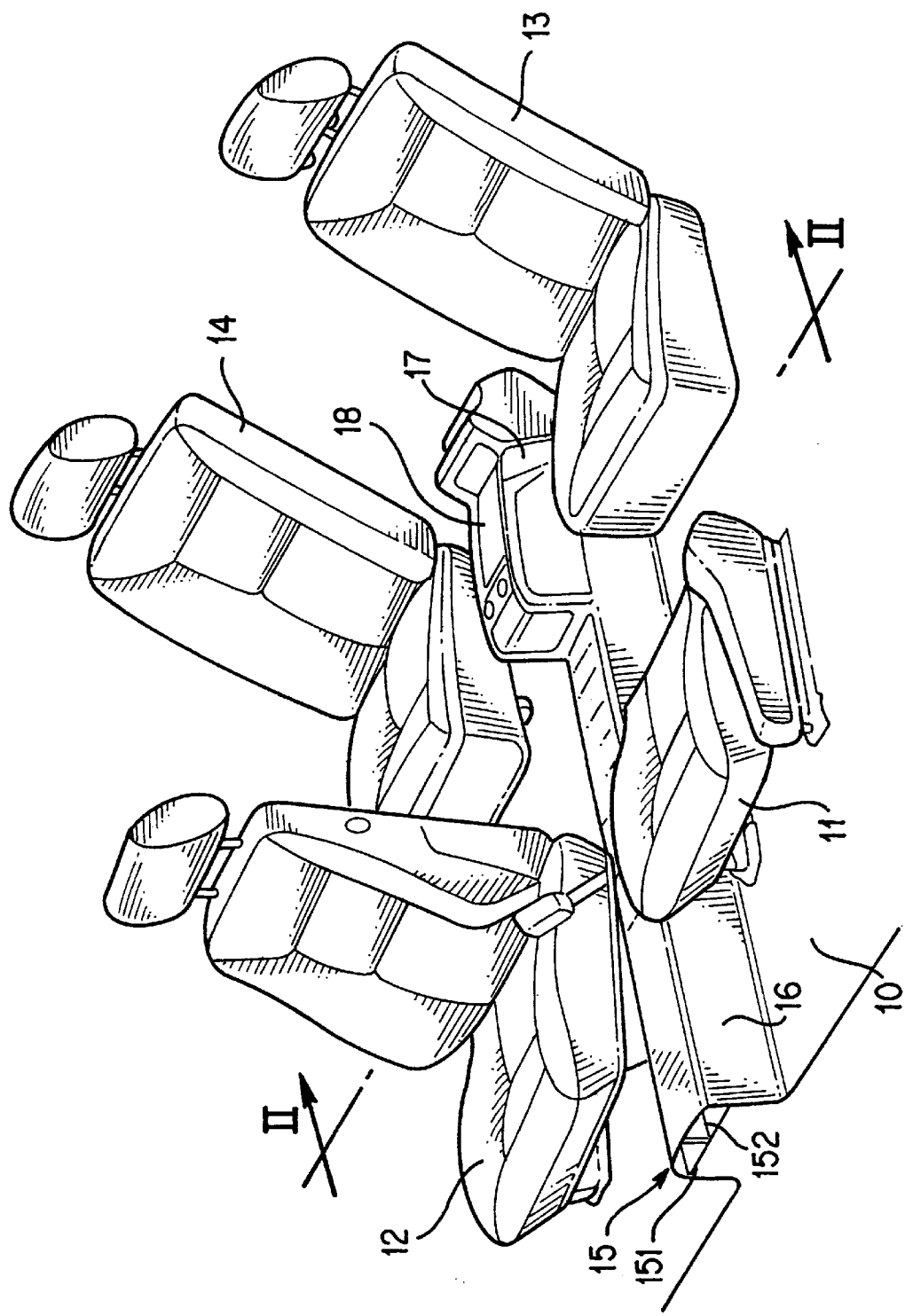
FIG. 1 is a perspective view of an arrangement of two front seats and two rear seats with a console displaceable on a ventilation shaft extending between the seats in a vehicle.

The portion of the vehicle shown in FIG. 1 includes a floor 10, and has two front seats 11, 12 and two rear seats 13, 14. The seats are secured and locked at lateral distances apart from one another on the vehicle floor 10, preferably displaceable lengthwise on guide rails in a generally known manner. On vehicle floor 10, a ventilation shaft 15 extends between the front seats 11, 12 and the rear seats 13, 14. The shaft 15 is mounted on the top of a center tunnel 16 which is integral with the vehicle floor. The ventilation shaft 15 is made as a twin shaft which has a warm air shaft 151 and a separate cool air shaft 152. The separate shafts 151, 152 run parallel to one another. Warm air shaft 151 is connected at the input to a warm air outlet opening of an air-conditioning system, for example an air conditioner, and cool air shaft 152 is connected at the input to the cool air outlet opening of the air-conditioning system also in a generally known manner.

A console 17, also called a box, is displaceable in a carriage-like manner on the ventilation shaft 15 and can be displaced from a position between the rear seats 13, 14 as shown in FIG. 1 along the ventilation shaft 15 into a position between the two front seats 11, 12, or even in front of the two front seats 11, 12 in order to access it from rear seats 13, 14 as well as from front seats 11, 12 in a convenient manner. The top of the console 17 is provided with a pivoting lid or cover 18. Raising of the lid 18 provides access to an interior chamber 20 to receive small objects of any kind. Instead of a pivoting lid 18, however, a sliding shutter can also be provided.

Figure 3:
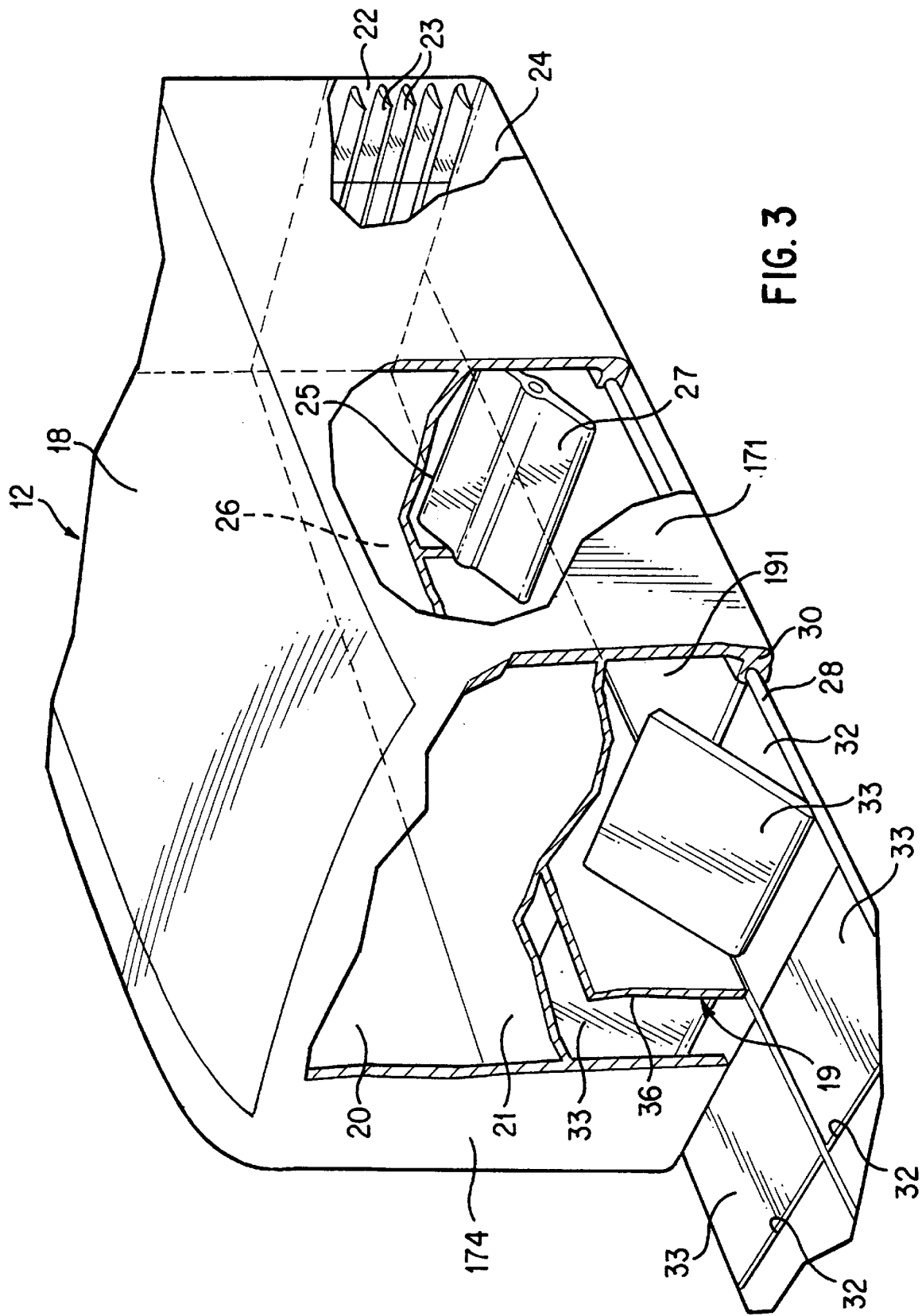
FIG. 3 is a perspective partial view of the console in the arrangement of FIG. 1.
Figure 4:
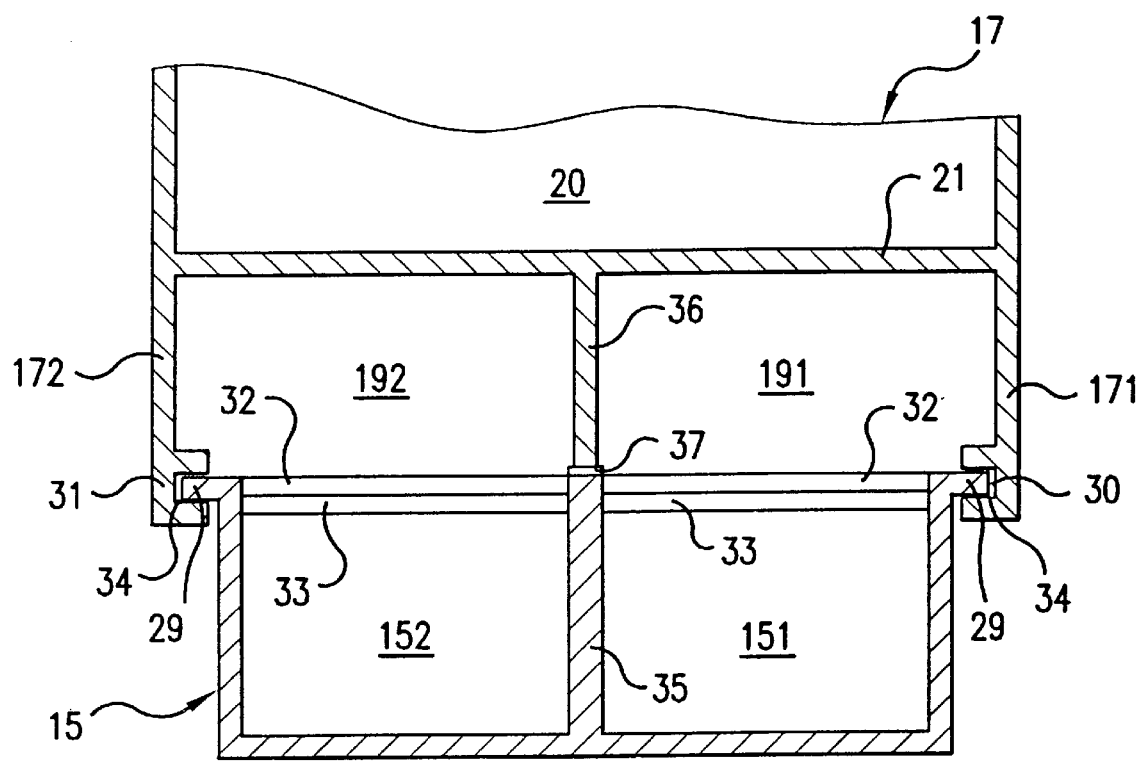
FIG. 4 is a partial cross-sectional view of the ventilation shaft and console along section II—II in FIG.

FIG. 3 shows the console 17 in an enlarged perspective view. A U-shaped air duct 19 is provided in the floor area of the console 17 and extends over the entire length thereof. The duct 19 is delimited on the console side by a floor panel 21 which delimits interior chamber 20 on the floor side and the side walls 171, 172 which project downward over floor panel 21, and on the ventilation shaft side from the top of the ventilation shaft 15 (see also FIG. 4). The air duct 19 terminates freely at end 173 of the console 17 which faces the rear seats 13, 14. The opening marked in FIG. 3 by the numeral 22 can be completely closed by hand or opened completely or partially by a set of pivoting blades or shutters 23 aligned parallel to one another and located horizontally to cover the opening 22.

The air duct 19 is configured as a twin duct with a warm air duct 191 and a cool air duct 192. The ducts 191, 192 are sealed off from front end 174 of console 17 and terminate in a mixing chamber 24 which is formed in the air duct 19 is located immediately in front of the opening 22. An inlet opening 25 of the warm air duct 191 leads into the mixing chamber 24 as shown in FIG. 3 and an inlet opening 26 for cool air duct 192 leads into mixing chamber 24. The inlet openings 25, 26 are each provided with a pivoting flap 27 to regulate the incoming air volume, with only the right-hand pivoting flap 27 for inlet opening 25 being shown in FIG. 3 for sake of clarity. The two pivoting flaps 27 can be operated independently of one another by a motor or manually, so that by metering the amount of warm air flowing into mixing chamber 24 from warm air duct 191 and the amount of cool air coming from cool air duct 192, the air entering through opening 22 into the foot area of rear seats 13, 14, can be adjusted to suit the individual wishes of the rear seat passengers.

The air supply to the air duct 19 comes through the ventilation shaft 15, whose top delimits the air duct 19 when the console 17 is placed on the ventilation shaft 15. The lengthwise displaceability of the console 17 on the ventilation shaft 15 is ensured by a carriage guide. The carriage guide is composed of two guide rails 28, 29 which project outward as flanges at or near the surface of the ventilation shaft 15 and two carriage strips 30, 31 each formed at the lower edges of the two side walls 171, 172 of the console 17. The strips 30, 31 overlap the guide rails 28, 29 on their upper and lower sides with a U-shaped guide section. The air connection between the ventilation shaft 15 and the air duct 19 is effected by a plurality of air outlet openings 32 in the top of the ventilation shaft 15 which faces the console 17. The openings 32 are provided with closing elements 33. The air outlet openings 32 are located one behind the other over the displaceability range of the console 17 in two side-by-side rows. One row of the air outlet openings 32 with the closing elements 33 is used for the air connection between warm air shaft 151 and the warm air duct 191, and one row of the air outlet openings 32 with the closing elements 33 is provided for the connection between the cool air shaft 152 and the cool air duct 192.

Figure 2:
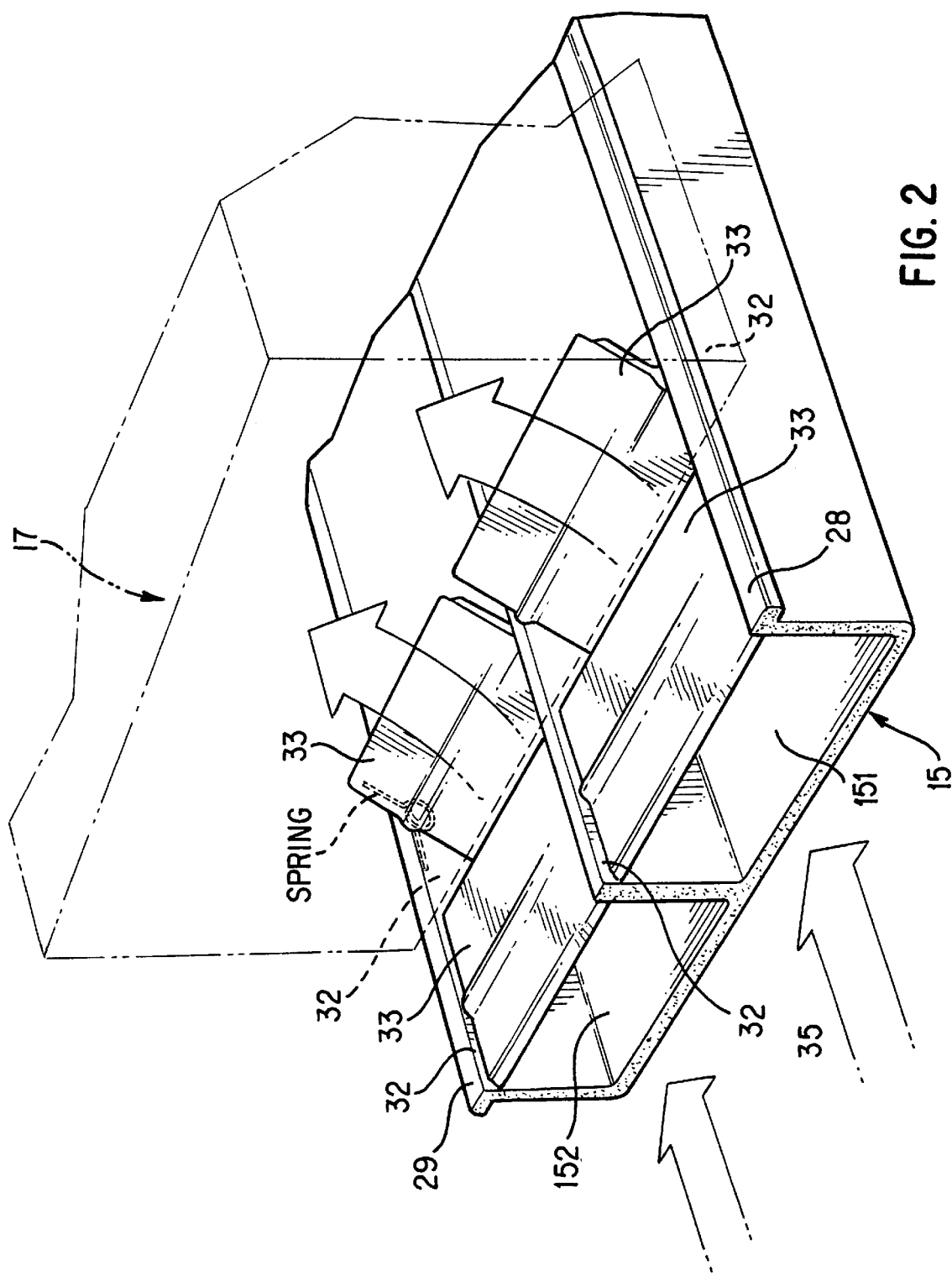
FIG. 2 is a perspective top view showing portions, on an enlarged scale, of the ventilation shaft along section II—II in FIG. 1.

As indicated in FIGS. 2 and 3, the air outlet openings 32 are sealed airtight by the closing elements 33. A conventional control mechanism (not shown) ensures that in the area of the ventilation shaft 15 which is covered by the air duct 19 in the console 17, at least one of the air outlet openings 32 in the warm air shaft 151 and at least one of the air outlet openings 32 in the cool air shaft 152 are exposed by their associated closing elements 33. The pivot mechanism triggers actuation of the closing elements 33 to open the air outlet openings 32 by displacement of the console 17, thereby sliding the air duct 19 over the air outlet openings 32. The permanent mounting of the closing elements 33 in their closed positions can be provided, for example, by springs. The pivot mechanism for actuating the closing elements 33 against a spring force when the air duct 19 is slid over the closing element 33 can be made in various ways. Thus, pneumatic, electrical, or electromagnetic actuation of the closing elements 33 is contemplated. In addition, mechanical control elements such as slot guides, lifting bevels, ramps or the like can be provided in the console 17 which, as they pass over the closing elements 33, lift them off the air outlet openings 32.

The closing elements 33 are preferably made in the form of pivoting flaps which, when actuated, are pivoted around a horizontally aligned pivot axis into the warm air duct 191 or the cool air duct 192. The pivot axes of the pivoting flaps are mounted rotatably in the shaft walls of the ventilation shaft 15, with the pivot axes being located on one side of the pivot flaps (FIG. 3) or centrally in the pivot flaps (FIG. 2). In the closed state, the closing elements 33 close off the air outlet openings 32 in largely airtight fashion by suitable seals. With the closing elements 33 open, a largely airtight connection is produced between the warm air shaft 151 and the warm air duct 191 as well as the cool air shaft 152 and the cool air duct 192. The seals are located at the bottoms of the U-shaped sectional guides for the carriage strips 30, 31 and pressing against the outer edges of the guide rail 28, 29. Both the warm air shaft 151 and the cool air shaft 152, as well as the warm air duct 191 and the cool air duct 192 are located inside the two partitions 35, 36 which separate the ventilation shaft 15 and the air duct 19 from one another, by way of a sealing strip 34 (FIG. 4) which extends over the entire length of partition 36 and is fastened thereto, so that alternately the passage of air between the warm air side and the cool air side of the ventilation shaft 15 and the air duct 19 is prevented.

To lock the console 17 in a desired displacement position on the ventilation shaft 15, a conventional locking device (not shown). The device can be releasable by way of an unlocking lever which is mounted on the forward and rear ends 174, 173, respectively, of console 17. The two unlocking levers (also not shown) allow convenient unlocking of the console 17 in any position for both the vehicle occupants in front seats 11, 12 and for those occupying rear seats 13, 14.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle, comprising a floor, front seats and rear seats operatively arranged relative to the floor, a ventilation shaft guided lengthwise between the front seats on the vehicle floor, said shaft being connectable to an air-conditioning system for ventilating a foot area of the rear seats, and a console configured to be displaceable in a displacement direction on said ventilation shaft and having an air duct formed in a bottom area thereof so as to be operatively connected with said ventilation shaft through air outlet openings provided in a wall of said ventilation shaft, wherein said air outlet openings are located one behind the other within a displacement range of said console in the displacement direction and are each provided with a closing element, and said console being arranged so as to overlap selective ones of said air outlet openings depending upon its location in the displacement direction.

2. The vehicle according to claim 1, wherein a carriage guide is located between said console and said ventilation shaft.

3. The vehicle according to claim 1, wherein springs are operatively arranged to bias said closing elements.

4. The vehicle according to claim 3, wherein a carriage guide is located between said console and said ventilation shaft.

5. The vehicle according to claim 1, wherein said ventilation shaft is a twin shaft with parallel warm and cool air shafts, and said air duct is a twin duct with parallel warm and cool air ducts and said air outlet openings are provided with said closing elements separately for coupling, on one hand, said warm air shaft and warm air duct and, on the other hand, coupling said cool air shaft and said cool air duct.

6. The vehicle according to claim 5, wherein said air duct formed in a bottom area of said console is delimited at an underside thereof by said ventilation shaft such that said console rests in a substantially airtight manner on top of said ventilation shaft.

7. The vehicle according to claim 6, wherein a carriage guide is located between said console and said ventilation shaft.

8. The vehicle according to claim 5, wherein said duct opening has a mixing chamber located in front thereof at a rear end of said console, in which mixing chamber the warm air duct and the cool air duct communicate for allowing volumes of air flowing from the warm and cool air ducts to flow into said mixing chamber.

* * * * *